(12) United States Patent
Niekamp

(10) Patent No.: US 11,486,296 B2
(45) Date of Patent: Nov. 1, 2022

(54) EXHAUST GAS TURBOCHARGER ASSEMBLY HAVING AN EXHAUST GAS TURBOCHARGER AND AN ACTUATOR

(71) Applicant: MAHLE International GmbH, Stuttgart (DE)

(72) Inventor: Peer Niekamp, Leutenbach (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/352,169

(22) Filed: Jun. 18, 2021

(65) Prior Publication Data
US 2021/0396170 A1 Dec. 23, 2021

(30) Foreign Application Priority Data

Jun. 19, 2020 (DE) ..................... 10 2020 207 638.3

(51) Int. Cl.
*F02B 37/18* (2006.01)
*F02B 37/24* (2006.01)
*B62D 27/06* (2006.01)
*F16B 5/02* (2006.01)

(52) U.S. Cl.
CPC .......... *F02B 37/183* (2013.01); *B62D 27/065* (2013.01); *F02B 37/24* (2013.01); *F16B 5/0241* (2013.01)

(58) Field of Classification Search
CPC ...... F02B 37/183; F02B 37/24; F02B 37/186; B62D 27/065; F16B 5/0241; F01D 17/105; F01D 17/162; F01D 25/243
See application file for complete search history.

(56) References Cited

U.S. PATENT DOCUMENTS

| 6,394,537 B1 | 5/2002 | DeRees |
| 6,872,040 B2 | 3/2005 | Deeg et al. |
| 8,109,089 B2 | 2/2012 | Gilch et al. |

(Continued)

FOREIGN PATENT DOCUMENTS

| DE | 10203829 A1 | 8/2002 |
| DE | 102006040667 B3 | 1/2008 |

(Continued)

*Primary Examiner* — Audrey B. Walter
*Assistant Examiner* — Edward Bushard
(74) *Attorney, Agent, or Firm* — Ewers IP Law PLLC; Falk Ewers

(57) ABSTRACT

An exhaust gas turbocharger assembly includes a turbocharger, an actuator, and a bolted connection for releasably securing the actuator housing on a housing flange of the turbocharger housing. The bolted connection includes a through opening, an aperture bounded at the circumference by an internal thread made of a metal, and a fit bolt with a bolt body which merges axially into a bolt head. The bolt body has a first axial body section with an external thread formed in a manner complementary to the internal thread of the aperture, and a second axial body section arranged axially between the bolt head and the first body section. The fit bolt engages through the through opening of the actuator housing in the internal thread of the aperture with the external thread to clamp the actuator housing between the housing flange of the turbocharger housing and the bolt head of the fit bolt.

11 Claims, 4 Drawing Sheets

(56) References Cited

U.S. PATENT DOCUMENTS

| | | |
|---|---|---|
| 2005/0057075 A1 | 3/2005 | Edwards |
| 2010/0202856 A1 | 8/2010 | Donovan |
| 2011/0274483 A1 | 11/2011 | Stojkov et al. |
| 2012/0227398 A1 | 9/2012 | Uhlig |
| 2013/0251475 A1 | 9/2013 | Schraer |

FOREIGN PATENT DOCUMENTS

| | | | |
|---|---|---|---|
| DE | 202010016444 U1 | 3/2011 | |
| DE | 102011017802 A1 | 11/2011 | |
| DE | 102012203520 A1 | 9/2013 | |
| EP | 299976 B1 | 2/1991 | |
| EP | 272642 B1 | 2/1993 | |
| EP | 390751 B1 | 11/1993 | |
| EP | 455888 B1 | 4/1995 | |
| EP | 1186781 A1 | 8/2000 | |
| EP | 1353081 B1 | 1/2005 | |
| EP | 2499340 | 5/2011 | |
| EP | 2636911 A1 | 9/2013 | |
| WO | 2005061903 A1 | 7/2005 | |
| WO | 2008023033 A1 | 2/2008 | |
| WO | 2011057888 A3 | 5/2011 | |
| WO | WO-2018150575 A1 * | 8/2018 | .............. F02B 37/18 |

* cited by examiner

EXHAUST GAS TURBOCHARGER ASSEMBLY HAVING AN EXHAUST GAS TURBOCHARGER AND AN ACTUATOR

CROSS REFERENCE TO RELATED APPLICATIONS

This application claims priority to German patent application DE 10 2020 207 638.3, filed Jun. 19, 2020, the entire content of which is incorporated herein by reference.

TECHNICAL FIELD

The disclosure relates to an exhaust gas turbocharger assembly having an exhaust gas turbocharger and an actuator. The disclosure furthermore relates to an internal combustion engine having such an exhaust gas turbocharger assembly and to a motor vehicle having such an internal combustion engine.

BACKGROUND

Modern exhaust gas turbochargers for internal combustion engines of motor vehicles often have a turbine which, in order to improve the efficiency of the exhaust gas turbocharger, comprises "variable turbine geometry" with adjustable guide vanes or a waste gate device having an adjustable waste gate valve. Here, adjustment often takes place with the aid of an electric actuator which is formed separately from the actual exhaust gas turbocharger and can be secured on the turbocharger housing with its actuator housing. In order to be able to remove the actuator from the exhaust gas turbocharger for maintenance or repair purposes, the actuator housing is typically secured on the turbocharger housing with releasable bolted connections.

Conventional exhaust gas turbocharger assemblies are generally equipped with bolted connections in which a metal bolt is bolted through metallic intermediate layers—these are typically formed by the actuator housing—into a metal thread provided on the exhaust gas turbocharger. As an alternative to this, it is also customary to use an actuator housing made of plastic, which is screw-fastened with a plastic flange by way of a self-tapping metal screw. For the metal screw, a through opening is provided in the actuator housing, and this opening can be reinforced with a metal bushing. Depending on the fastening direction of the metal screw, the metal bushing may be a through bushing without a thread or a threaded bushing.

SUMMARY

It is an object of the present disclosure to provide an exhaust gas turbocharger assembly having bolted connections which is distinguished by simplified production and thus also by lower production costs.

The object is achieved by the exhaust gas turbocharger assembly, the internal combustion engine, and the motor vehicle having an internal combustion engine, as described herein.

A basic concept of the disclosure is therefore to provide plastic through openings in the actuator housing of the actuator and to arrange a metallic thread in the housing flange of the turbocharger housing. If, according to an aspect of the disclosure, a fit bolt is used for the bolted connection between the actuator housing and the housing flange, the actuator housing can be clamped between the bolt head of the fit bolt and the housing flange with the fit bolt. Embodiment as a fit bolt ensures that the actuator housing can be moved only to a small extent transversely to the screwing direction of the fit bolt. In this way, highly accurate positioning of the actuator housing relative to the turbocharger housing is achieved. In the solution according to the disclosure presented here, it is furthermore possible to dispense with the use in the actuator housing of bushings known from conventional bolted connections for turbocharger assemblies, thereby simplifying the construction of the exhaust gas turbocharger assembly. This is associated with reduced production costs.

An exhaust gas turbocharger assembly according to the disclosure comprises an exhaust gas turbocharger having a compressor and a turbine. The exhaust gas turbocharger comprises a turbocharger housing for accommodation, which, in particular, can comprise a compressor housing, a turbine housing and a bearing housing. The exhaust gas turbocharger assembly has an actuator for adjusting a variable turbine geometry and/or a waste gate device of the turbine. The actuator furthermore comprises an actuator housing. The exhaust gas turbocharger assembly further comprises at least one bolted connection for releasably securing the actuator housing on a housing flange of the turbocharger housing. The at least one bolted connection comprises a through opening, which is provided in the actuator housing and is bounded by plastics material. The at least one bolted connection further comprises an aperture, which is provided in the housing flange and is bounded at the circumference by an internal thread made of a metal. The at least one bolted connection further comprises a fit bolt, which has a bolt body that merges into a bolt head along an axial direction.

The bolt body of the fit bolt has a first axial body section, which is axially remote from the bolt head and has an external thread formed in a manner complementary to the internal thread of the aperture. Furthermore, the bolt body has a second axial body section, which is arranged in the axial direction between the bolt head and the first axial body section. In this case, a first body section diameter of the first body section is smaller than a second body section diameter of the second body section. In addition, a head diameter of the bolt head is larger than the second body section diameter. According to the disclosure, the fit bolt engages through the through opening of the actuator housing with the second body section and engages in the internal thread of the aperture with the external thread of the second body section, with the result that the actuator housing is clamped between the housing flange of the turbocharger housing and the bolt head of the fit bolt.

The axial direction is expediently defined by the alignment of the central longitudinal axis of the bolt body in the installed state of the fit bolt, i.e., the central longitudinal axis extends in the axial direction. A radial direction extends perpendicularly away from the central longitudinal axis. All diameters described in connection with the present disclosure are expediently measured along the radial direction of the installed fit bolt, and all lengths are expediently measured along the axial direction. A circumferential direction extends perpendicularly both to the axial direction and to the radial direction and runs around the central longitudinal axis.

According to a preferred embodiment, a second section length of the second body section has a value which is at most as large as the value of a through opening length of the through opening. Here, the second section length is measured along the axial direction. As a particular preference, the value of the second section length is less than the value of the through opening length by at most 0.3 mm, preferably by at most 0.1 mm.

According to an advantageous development, the second body section of the fit bolt forms an interference fit with the plastics material bounding the through opening of the actuator housing at the circumference. In this way, movement of the actuator housing transversely to the axial direction of the fit bolt, that is to say along the radial direction, is prevented. Thus, high positioning accuracy of the actuator housing relative to the turbocharger housing is achieved.

As a particular preference, a rib structure, preferably having a plurality of axially extending longitudinal ribs, or a tribular structure, is formed on the outer circumference of the second body section. This rib structure facilitates the formation of the desired interference fit and is moreover simple to produce and thus inexpensive.

According to an advantageous development, the selected second body section diameter is larger than an aperture diameter of the aperture. In this way, the second body section acts as an axial stop. In addition, a preloading force, with which the fit bolt can be held in a particularly stable manner in the aperture and thus fixed to the housing flange, is generated as the fit bolt is screwed in.

It is expedient if the selected head diameter is larger than an opening diameter of the through opening. This ensures that the actuator housing can be clamped in a stable manner between the bolt head and the housing flange.

According to an advantageous development, the aperture comprises a radial step, with the result that the diameter of the aperture is increased toward the surface of the housing flange. Thus, the positioning accuracy perpendicularly to the axial direction brought about with the interference fit between the actuator housing and the fit bolt is imparted to the turbocharger housing.

According to an advantageous development, the actuator, in particular the actuator housing, is received in the aperture with an end section facing the turbocharger, in particular as far as the radial step. In this way, the actuator is prevented from moving transversely to the axial direction after relaxation of the actuator housing.

The disclosure further relates to an internal combustion engine having a plurality of cylinders and an exhaust system for discharging exhaust gas from the cylinders. The internal combustion engine also comprises an exhaust gas turbocharger assembly according to the disclosure presented above. The abovementioned advantages of the exhaust gas turbocharger assembly are therefore also conferred on the internal combustion engine according to the disclosure.

The disclosure also relates to a motor vehicle having such an internal combustion engine, and therefore the advantages of the exhaust gas turbocharger assembly which have been explained above are also conferred on the motor vehicle according to the disclosure.

Further important features and advantages of the disclosure will be found in the dependent claims, the drawings and the associated description of the figures with reference to the drawings.

It is self-evident that the features mentioned above and those that will be explained below can be used not only in the respectively specified combination but also in other combinations or on their own without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
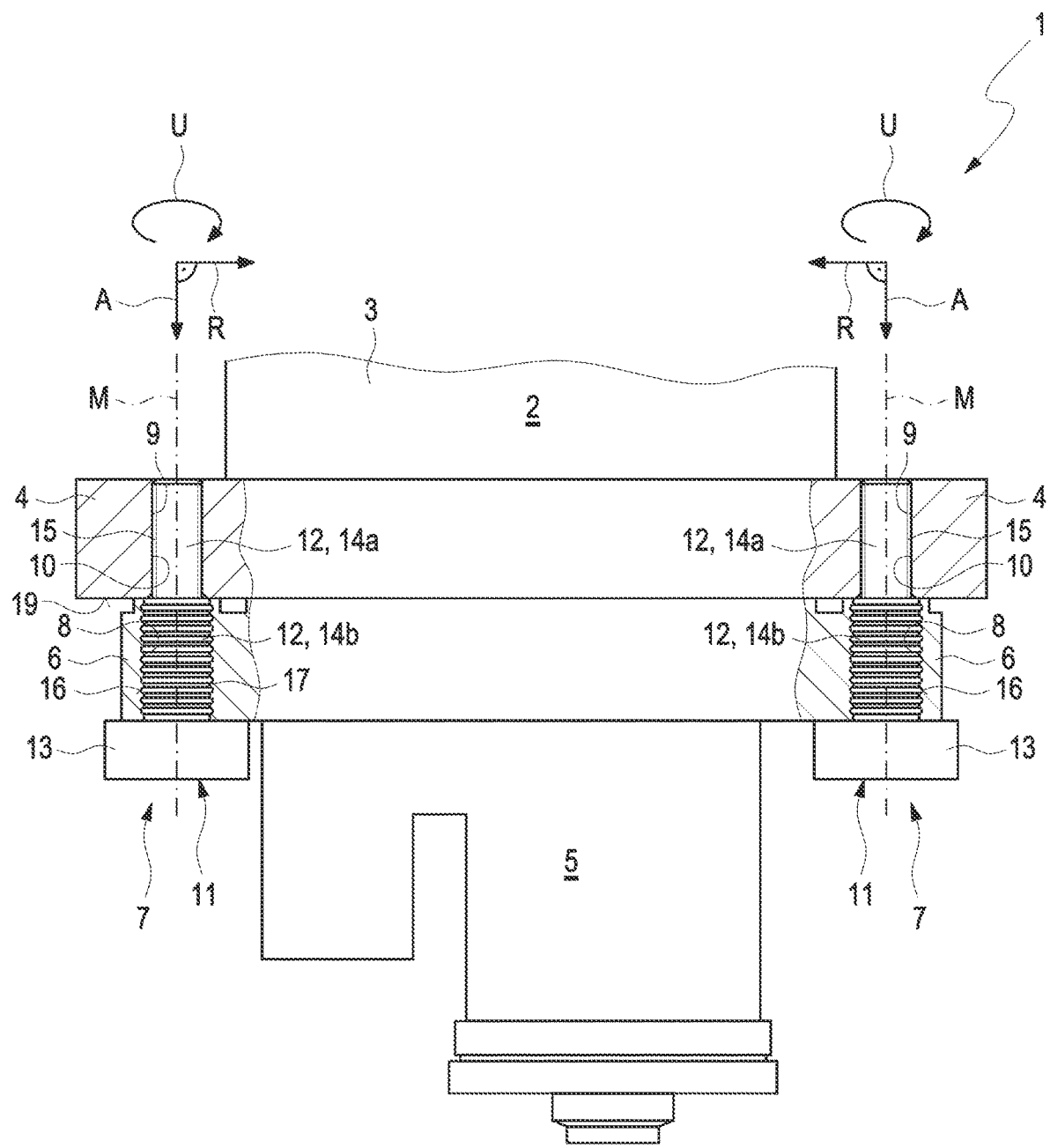
FIG. 1 shows an example of an exhaust gas turbocharger assembly according to an exemplary embodiment of the disclosure.

Exemplary embodiments of the disclosure are illustrated in the drawings and are explained in greater detail in the following description, wherein identical reference signs refer to identical or similar or functionally identical components.

FIG. 1 shows an exemplary embodiment of an exhaust gas turbocharger assembly 1 according to the disclosure. The exhaust gas turbocharger assembly 1 comprises an exhaust gas turbocharger 2, which has a compressor and a turbine in a known manner. The exhaust gas turbocharger 2 further comprises a turbocharger housing 3 having a housing flange 4. The turbocharger housing 3 can be or comprise a respectively known compressor housing, a turbine housing and a bearing housing of the exhaust gas turbocharger 2. The exhaust gas turbocharger assembly 1 has an actuator 5 for adjusting a variable turbine geometry or/and a waste gate device of the turbine. The actuator 5 furthermore comprises an actuator housing 6. The actuator housing 6 is secured releasably on the housing flange 4 of the turbocharger housing 3 with a plurality of bolted connections 7, which are part of the exhaust gas turbocharger assembly 1.

Figure 2:
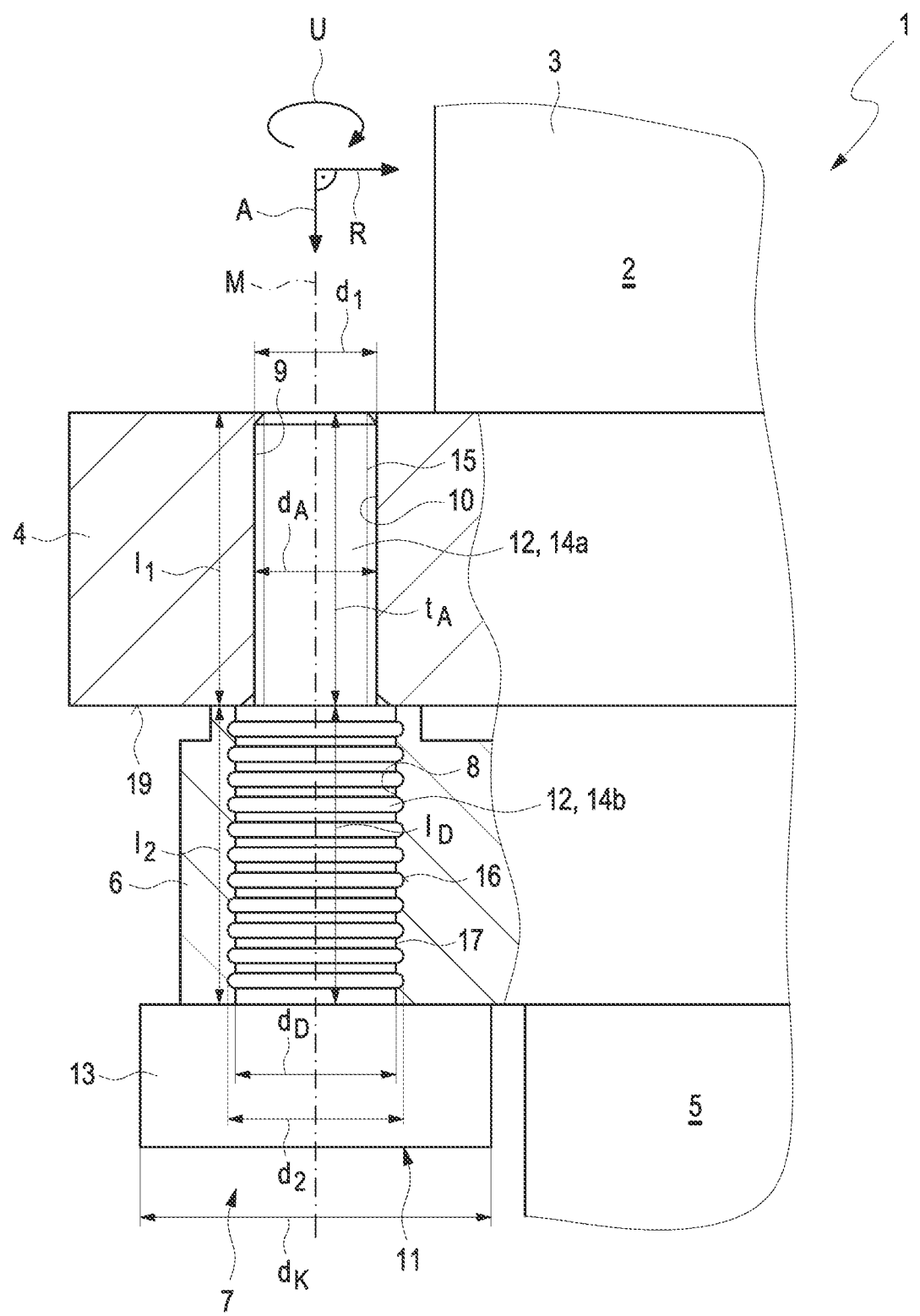
FIG. 2 shows a detail illustration of the exhaust gas turbocharger assembly of FIG. 1 in the region of a bolted connection between the turbocharger housing and the actuator housing.

FIG. 2 shows the exhaust gas turbocharger assembly 1 of FIG. 1 in a detailed illustration in the region of a bolted connection 7 of this kind. The bolted connection 7 accordingly comprises a through opening 8, which is provided in the actuator housing 6 and is bounded by the plastics material of the actuator housing 6. The bolted connection 7 also comprises an aperture 9, which is provided in the housing flange 4 and is bounded at the circumference by an internal thread 10 made of metal. The bolted connection 7 furthermore comprises a fit bolt 11, which has a bolt body 12 that merges into a bolt head 13 along an axial direction A of the bolt body 12.

In this context, the axial direction A is defined by the alignment of a central longitudinal axis M of the bolt body 12 in the installed state of the fit bolt 11, that is to say that the central longitudinal axis extends in the axial direction A in this state of the fit bolt 11. A radial direction R extends perpendicularly away from the central longitudinal axis M. A circumferential direction U extends perpendicularly both to the axial direction A and to the radial direction R and runs around the central longitudinal axis M.

As can be seen in FIG. 2, the bolt body 12 has a first axial body section 14$a$, which is axially remote from the bolt head 13 and has an external thread 15 formed in a manner complementary to the internal thread 10 of the aperture 9. A second axial body section 14$b$ is arranged axially between the bolt head 13 and the first axial body section 14$a$. A first body section diameter $d_1$ of the first body section 14$a$ is smaller than a second body section diameter $d_2$ of the second body section 14$b$. A head diameter $d_K$ of the bolt head 13 is larger than the second body section diameter $d_2$.

In the assembled state shown in FIGS. 1 and 2 of the exhaust gas turbocharger assembly 1, the fit bolt 11 engages through the through opening 8 of the actuator housing 6 with the second body section 14b. The fit bolt 11 engages in the internal thread of the aperture 9 with the external thread 15 of the second body section 14b, with the result that the actuator housing 6 is clamped between the housing flange 4 of the turbocharger housing 3 and the bolt head 13 of the fit bolt.

As FIG. 2 illustrates, the second body section diameter $d_2$ is larger than an aperture diameter $d_A$ of the aperture 9. Furthermore, the head diameter $d_K$ is larger than an opening diameter $d_D$ of the through opening 8.

In this case, a first section length 11 of the first body section 14a is smaller than an aperture depth to of the aperture 9 measured along the axial direction A.

Here, a second section length 12 of the second body section 14b expediently has a value which is at most as large as the value of a through opening length 1D of the through opening 8. The through opening length 1D can be 12 mm or more, for example. It is particularly expedient if the value of the second section length 12 is less than the value of the through opening length 1D by at most 0.3 mm, preferably by at most 0.1 mm. The second body section 14b of the fit bolt 11 expediently forms an interference fit 17 with the plastics material bounding the through opening 8 of the actuator housing 6 at the circumference. A rib structure 18 can be provided on the outer circumference 16 of the second body section 14b in order to form the interference fit 17. Such a rib structure preferably comprises a plurality of axially extending longitudinal ribs, or else a tribular structure.

Figure 3:
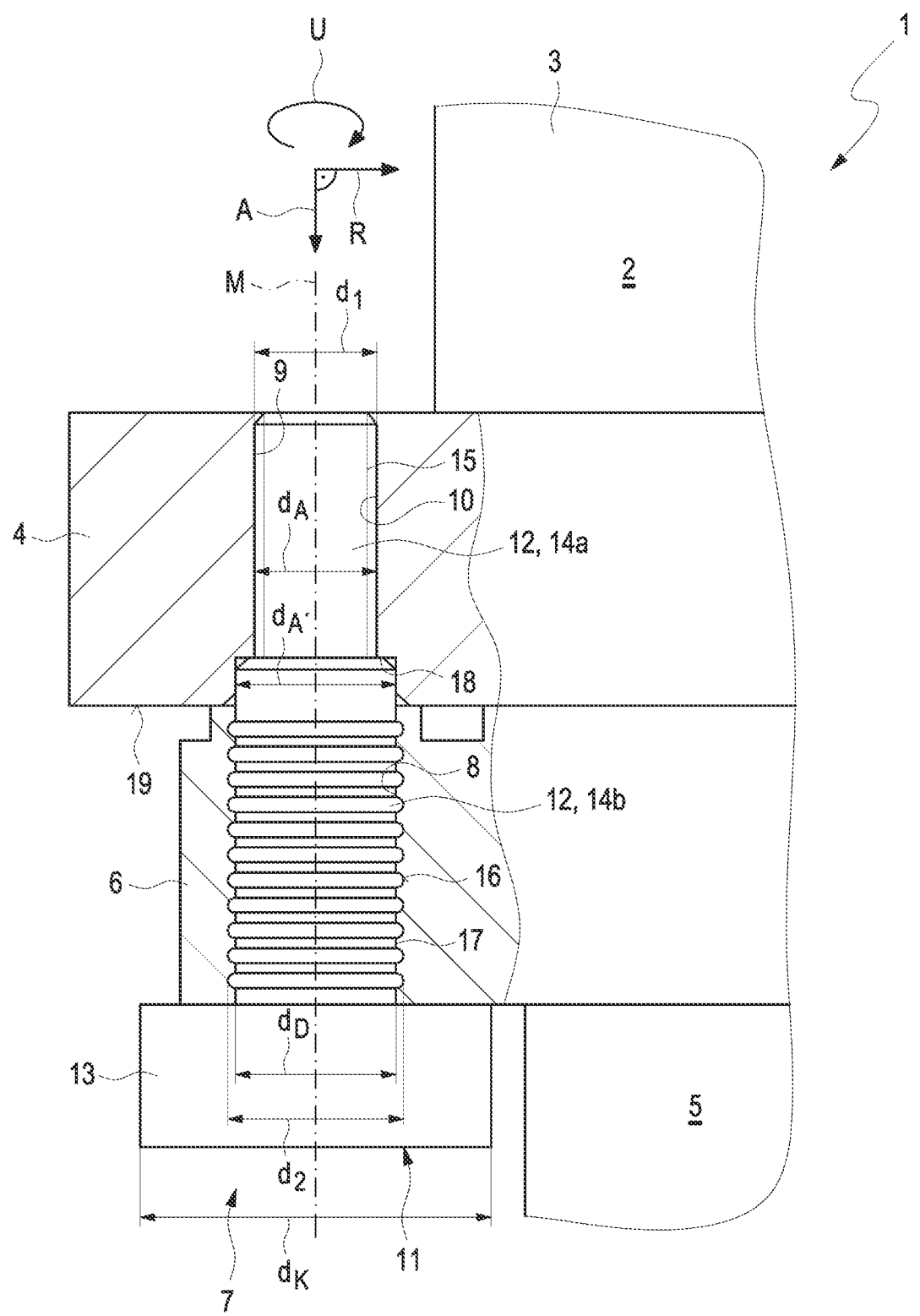
FIG. 3 shows a variant of the exemplary embodiment shown in FIGS. 1 and 2.

FIG. 3 shows a development of the example in FIGS. 1 and 2. In the example in FIG. 3, the aperture 9 provided in the housing flange 4 has a radial step, with the result that the diameter $d_A$ of the aperture 9 is increased toward the surface 19 of the housing flange 4. The increased diameter of the aperture 9 is denoted in FIG. 3 by $d_A'$. Thus, the positioning accuracy perpendicularly to the axial direction A brought about with the interference fit 17 between the actuator housing 6 and the fit bolt 11 is imparted to the turbocharger housing 3.

Figure 4:
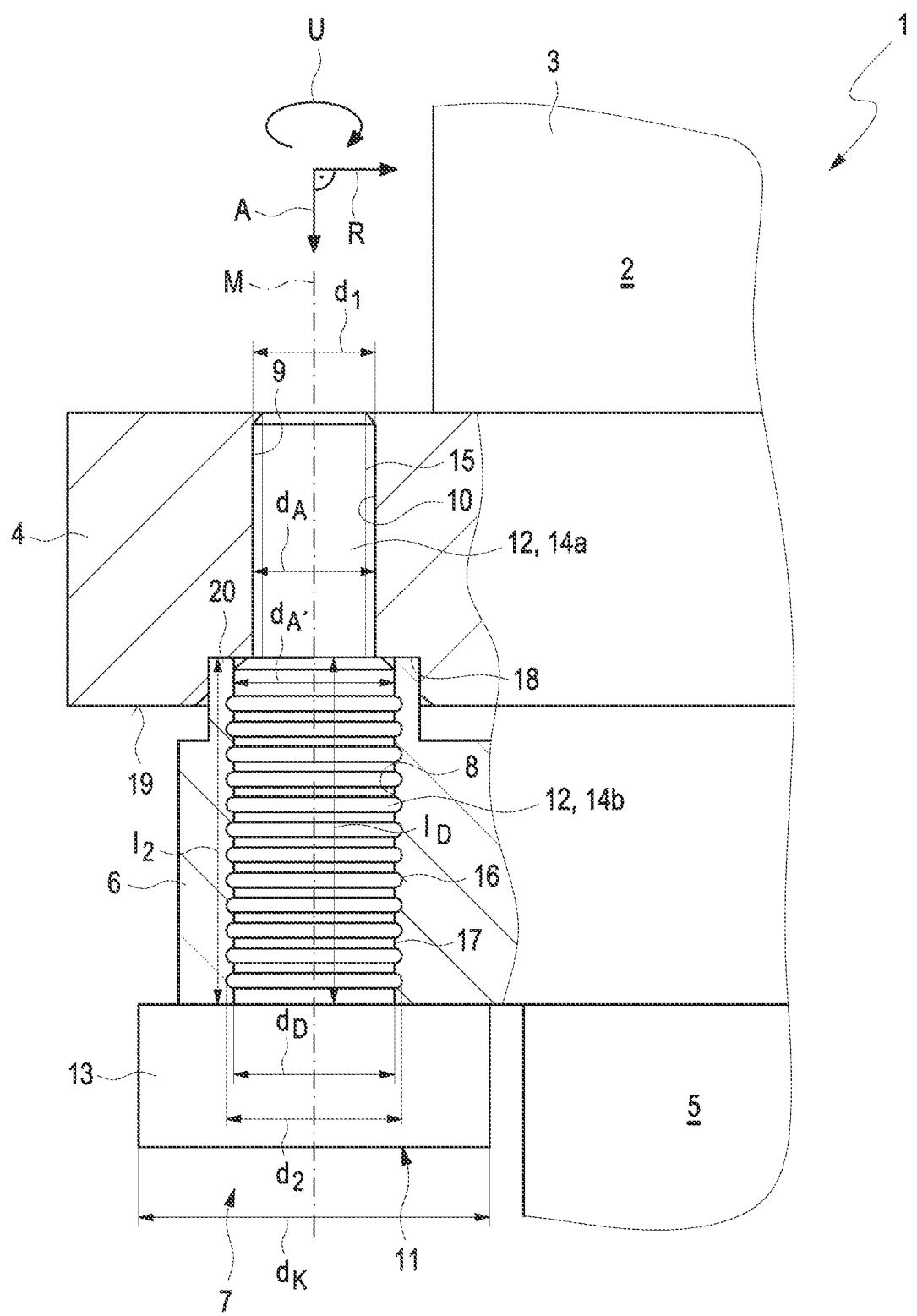
FIG. 4 shows a development of the exemplary embodiment shown in FIG. 3.

In a development of the example in FIG. 3 that is shown in FIG. 4, the actuator housing 6 of the actuator 5 is received in the aperture 9 with an end section 20 facing the turbocharger 2, which end section also comprises an end section of the through opening 8 facing the turbocharger 2, in particular as far as the radial step 18.

This prevents the actuator 5 from moving transversely to the axial direction A after relaxation of the actuator housing 6.

What is claimed is:

1. An exhaust gas turbocharger assembly, comprising:
   an exhaust gas turbocharger which comprises a compressor and a turbine and has a turbocharger housing;
   an actuator, comprising an actuator housing, for adjusting a variable turbine geometry and/or a waste gate device of the turbine;
   at least one bolted connection for releasably securing the actuator housing on a housing flange of the turbocharger housing, wherein the at least one bolted connection comprises:
      a through opening, which is provided in the actuator housing and is bounded by plastics material of the actuator housing;
      an aperture, which is provided in the housing flange and is bounded at the circumference by an internal thread made of a metal; and
      a fit bolt, which has a bolt body which merges axially into a bolt head,
   wherein the bolt body has a first axial body section, which is axially remote from the bolt head and has an external thread formed in a manner complementary to the internal thread of the aperture, and a second axial body section, which is arranged axially between the bolt head and the first body section,
   wherein a first body section diameter of the first body section is smaller than a second body section diameter of the second body section, and a head diameter of the bolt head is larger than the second body section diameter, and
   wherein the fit bolt engages through the through opening of the actuator housing with the second body section and engages in the internal thread of the aperture with the external thread of the second body section, with the result that the actuator housing is clamped between the housing flange of the turbocharger housing and the bolt head of the fit bolt.

2. The exhaust gas turbocharger assembly according to claim 1, wherein a second section length of the second body section has a value which is at most as large as the value of a through opening length of the through opening.

3. The exhaust gas turbocharger assembly according to claim 1, wherein the value of the second section length is less than the value of the through opening length by at most 0.3 mm, preferably by at most 0.1 mm.

4. The exhaust gas turbocharger assembly according to claim 1, wherein the second body section of the fit bolt forms an interference fit with the plastics material bounding the through opening of the actuator housing at the circumference.

5. The exhaust gas turbocharger assembly according to claim 1, wherein a rib structure, preferably having a plurality of axially extending longitudinal ribs, or a tribular structure, is formed on the outer circumference of the second body section in order to form the interference fit.

6. The exhaust gas turbocharger assembly according to claim 1, wherein the second body section diameter is larger than an aperture diameter of the aperture.

7. The exhaust gas turbocharger assembly according to claim 1, wherein the head diameter is larger than an opening diameter of the through opening.

8. The exhaust gas turbocharger assembly according to claim 1, wherein the aperture has a radial step, with the result that the diameter of the aperture is increased toward the surface of the housing flange.

9. The exhaust gas turbocharger assembly according to claim 1, wherein the actuator, in particular the actuator housing, is received in the aperture with an end section facing the turbocharger, in particular as far as the radial step.

10. An internal combustion engine, comprising:
    a plurality of cylinders and an exhaust system for discharging exhaust gas from the cylinders; and
    the exhaust gas turbocharger assembly according to claim 1.

11. A motor vehicle having an internal combustion engine according to claim 10.

* * * * *